US009774445B1

(12) United States Patent
Gandhasri

(10) Patent No.: US 9,774,445 B1
(45) Date of Patent: Sep. 26, 2017

(54) HOST BASED REKEYING

(75) Inventor: Rajamohan Gandhasri, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 2253 days.

(21) Appl. No.: 11/772,447

(22) Filed: Sep. 4, 2007

(51) Int. Cl.
*H04K 1/00* (2006.01)
*H04L 9/08* (2006.01)

(52) U.S. Cl.
CPC .............. *H04L 9/08* (2013.01); *H04L 9/0891* (2013.01)

(58) Field of Classification Search
CPC .......... H04W 12/04; H04L 9/08; H04L 9/083; H04K 1/00
USPC ........................................ 380/372, 273, 277
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,588,991 A | 5/1986 | Atalla | |
| 4,757,533 A | 7/1988 | Allen et al. | |
| 5,065,429 A | 11/1991 | Lang | |
| 5,150,407 A | 9/1992 | Chan | |
| 5,185,717 A | 2/1993 | Mori | |
| 5,235,641 A | 8/1993 | Nozawa | |
| 5,235,642 A | 8/1993 | Wobber et al. | |
| 5,265,159 A | 11/1993 | Kung | |
| 5,265,164 A | 11/1993 | Matyas et al. | |
| 5,677,952 A | 10/1997 | Blakley, III et al. | |
| 5,687,237 A | 11/1997 | Naclerio | |
| 5,720,034 A | 2/1998 | Case | |
| 5,850,448 A | 12/1998 | Ganesan | |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane | |
| 5,991,406 A | 11/1999 | Lipner et al. | |
| 6,073,237 A | 6/2000 | Ellison | |
| 6,134,660 A | 10/2000 | Boneh et al. | |
| 6,175,924 B1 | 1/2001 | Arnold | |
| 6,185,681 B1 | 2/2001 | Zizzi | |
| 6,185,684 B1 | 2/2001 | Pravetz et al. | |
| 6,212,600 B1 | 4/2001 | Friedman et al. | |
| 6,249,866 B1 | 6/2001 | Brundrett | |

(Continued)

FOREIGN PATENT DOCUMENTS

WO WO 02/093314 A2 11/2002
WO WO 02/093314 A3 11/2002

OTHER PUBLICATIONS

Baldwin, et al., "Encryption and Key Management in a SAN," Hewlett Packard Laboratories, Bristol, UK, 10 pages, 2002.

(Continued)

*Primary Examiner* — Kambiz Zand
*Assistant Examiner* — Suman Debnath
(74) *Attorney, Agent, or Firm* — LeClairRyan, a Professional Corporation

(57) ABSTRACT

A system and method for re-keying ciphertext on a storage system is resident on a host/client communicating with a storage system. The generation of encryption keys and tracking which storage system blocks are encrypted with what keys remain with the security appliance or storage system, but the policy governing re-keying and initiating actions in accordance with that policy reside with the client/host.

20 Claims, 6 Drawing Sheets

(56) References Cited

U.S. PATENT DOCUMENTS

| | | | |
|---|---|---|---|
| 6,272,632 B1 | 8/2001 | Carman et al. | |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,684,222 B1 | 1/2004 | Cornelius et al. | |
| 6,735,693 B1 | 5/2004 | Hamlin | |
| 6,754,827 B1 | 6/2004 | Cane et al. | |
| 6,792,544 B2 | 9/2004 | Hashem | |
| 6,839,437 B1 | 1/2005 | Crane et al. | |
| 6,851,056 B2 | 2/2005 | Evans | |
| 6,857,076 B1 | 2/2005 | Klein | |
| 6,868,406 B1 | 3/2005 | Ogg et al. | |
| 6,915,435 B1 | 7/2005 | Merriam | |
| 6,931,133 B2 | 8/2005 | Andrews et al. | |
| 6,993,661 B1 | 1/2006 | Garfinkel | |
| 7,003,674 B1 | 2/2006 | Hamlin | |
| 7,020,779 B1 | 3/2006 | Sutherland | |
| 7,093,127 B2 | 8/2006 | McNulty et al. | |
| 7,096,355 B1 | 8/2006 | Marvit et al. | |
| 7,120,696 B1 | 10/2006 | Au et al. | |
| 7,136,995 B1 | 11/2006 | Wann | |
| 7,139,917 B2 | 11/2006 | Jablon | |
| 7,146,505 B1 | 12/2006 | Harada et al. | |
| 7,188,253 B2 | 3/2007 | Halasz et al. | |
| 7,215,771 B1 | 5/2007 | Hamlin | |
| 7,222,228 B1 | 5/2007 | Stephens et al. | |
| 7,240,197 B1 | 7/2007 | Yamagami et al. | |
| 7,260,724 B1 | 8/2007 | Dickinson et al. | |
| 7,277,544 B1 * | 10/2007 | Eye | G06F 21/10 369/47.12 |
| 7,340,500 B2 | 3/2008 | Traversat et al. | |
| 7,346,160 B2 | 3/2008 | Michaelsen | |
| 7,383,436 B2 | 6/2008 | Srivastava et al. | |
| 7,792,300 B1 * | 9/2010 | Caronni | G06Q 20/3829 380/259 |
| 2001/0054155 A1 | 12/2001 | Hagan et al. | |
| 2002/0046286 A1 | 4/2002 | Caldwell et al. | |
| 2002/0073324 A1 | 6/2002 | Hsu | |
| 2002/0114453 A1 | 8/2002 | Bartholet et al. | |
| 2003/0021417 A1 | 1/2003 | Vasic et al. | |
| 2003/0028765 A1 | 2/2003 | Cromer et al. | |
| 2004/0030668 A1 | 2/2004 | Pawlowski et al. | |
| 2004/0107342 A1 | 6/2004 | Pham et al. | |
| 2004/0254882 A1 * | 12/2004 | Scheidt et al. | 705/50 |
| 2005/0286722 A1 * | 12/2005 | Aboba et al. | 380/277 |
| 2007/0058801 A1 | 3/2007 | Plotkin | |
| 2007/0174634 A1 | 7/2007 | Plotkin | |
| 2007/0226807 A1 * | 9/2007 | Ginter et al. | 726/27 |
| 2007/0297610 A1 * | 12/2007 | Chen | H04L 9/0822 380/270 |
| 2008/0126813 A1 * | 5/2008 | Kawakami | G06F 21/72 713/193 |
| 2008/0301791 A1 | 12/2008 | Smith et al. | |
| 2009/0089450 A1 | 4/2009 | Weatherford et al. | |
| 2009/0089867 A1 | 4/2009 | Weatherford et al. | |
| 2009/0180620 A1 * | 7/2009 | Batcher | 380/277 |

OTHER PUBLICATIONS

Bojinov, et al., Apparatus for Lifetime Key Management, U.S. Appl. No. 11/740,474, filed Apr. 26, 2007, 26 pages.
Bojinov, et al., Encryption Keys for Data Recovery in Storage Security Appliances, U.S. Appl. No. 11/532,025, filed Sep. 14, 2006, 16 pages.
Ishii, H., et al., Cluster Key Synchronization, U.S. Appl. No. 11/741,495, filed Apr. 27, 2007, 33 pages.
Ishii, H., et al., Peer to Peer Key Synchronization, U.S. Appl. No. 11/740,490, filed Apr. 26, 2007, 31 pages.
Subramanian, A., et al., System and Method for Initial Key Establishment Using a Split Knowledge Protocol, U.S. Appl. No. 11/540,440, filed Sep. 29, 2007, 27 pages.
Menezes et al., "Handbook of Applied Cryptography," CRC Press, pp. 1-794, 1997.
Anderson et al., "The Steganographic File System," Information Hiding, Second International Workshop, IH '98 Portland, Oregon. USA, Apr. 14-17, 1998, Proceedings, pp. 73-82, 1998.
Antonelli, et al., "The Packet Vault: Secure Storage of Network Data," CITI Technical Report 98-5, pp. 1-15, Jun. 25. 1998.
Blaze, "Oblivious Key Escrow," Information Hiding, First International Workshop, Cambridge, UK, May 3D-Jun. 1, 1996, Proceedings, pp. 335-343, 1996.
Blaze, "A cryptographic File System for Unix," Proceedings of the First ACM Conference on Computer and Communications Security, pp. 9-16 (1993).
Blaze, "Key Management in an Encrypting File System," USENIX Summer 1994 Technical Conference, pp. 27-35, (Jun. 6-10, 1994).
Boneh, et al., "A Revocable Backup System," In Proceedings 6th USENIX Security Conference, pp. 91-96, 1996.
Cattaneo, et al. "The Design and Implementation of a Transparent Cryptographic Filesystem for UNIX," Proceedings of The FREENIX Track: 2001 UNIX Annual Technical Conference. pp. 199-212 (Jun. 25-30, 2001).
Christy, et al., "Mechanism for Secure Off-Site Computer Access," IBM Technical Disclosure Bulletin. pp. 6754-6756. Apr. 1985.
Clark, "Physical Protection of Cryptographic Devices," Lecture Notes in Computer Science. Advances in Cryptology—EUROCRYPT '87, pp. 83-93 (Apr. 13-15, 1987).
Coleman et al., "Mass Storage System Reference Manual: Version 4," Technical Committee on Mass Storage Systems and Technology, IEEE, pp. 1-38, May 1990.
Comba, "Approaches to Cryptographic Key Management," Symposium on Applied Computing. Proceedings of the Northeast ACM Symposium on Personal Computer Security, pp. 38-45 (1986).
Denning, "Cryptography and Data Security," Addison-Wesley Publishing Co., pp. 164-169 and 179, 1982.
Di Crescenzo, et al., "How to Forget a Secret (Extended Abstract)," 16th Annual Symposium on Theoretical Aspects of Computer Science, pp. 500-509 (Mar. 4-6, 1999).
Dietrich, "Security Enclosure With Elastomeric Contact Stripes," IBM Technical Disclosure Bulletin, pp. 444-445, Feb. 1991.
"Disappearing Inc. Makes Old Email Vanish Everywhere; Reduces Corporate Liability as well as Improves Corporate Productivity by Enabling Sensitive Communications via Email—Company Business and Marketing," Edge: Work-Group Computing Report, http://findarticles.com/p/articJes/mLmOWUB/is_1999_0cU 1/aL 56260487/print (Oct. 11, 1999).
Double, "Encryption Key Security by Electric Field Destruction of Memory Cells," IBM Technical Disclosure Bulletin, pp. 8-11, Jan. 1989.
FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.
FIPS PUB 140-1, "Security Requirements for Cryptographic Modules," Federal Information Processing Standards Publication 140-1, National Institute of Standards and Technology, Jan. 11, 1994, 44 pages.
Flavin, et al., "Data Protection on Magnetic Media Via an Encrypting Controller," IBM Technical Disclosure Bulletin, vol. 3D, No. 3, pp. 1284-1285 (Aug. 1987).
Garfinkel, S., "PGP: Pretty Good Privacy," O'Reilly & Associates, pp. 43 and 65-67, Jan. 1995.
Garfinkel, S., "PGP: Pretty Good Privacy," O'Reilly & Associates, pp. 54-55, 151-153, Jan. 1995.
Garfinkel, S., "Omniva's Self-Destructing Email," Web Security, Privacy and Commerce, Second Edition, O'Reilly & Associates, Inc., Sebastopol, CA, pp. 280-283, Jan. 2002.
Gobioff, Howard, et al., "Security for Networked Attached Storage Devices," Carnegie Mellon University Computer Science Technical Report CMU-CS-97-185, Oct. 1997, 20 pages.

(56) References Cited

OTHER PUBLICATIONS

Gobioff, Howard, "Security for a High Performance Commodity Storage Subsystem," Carnegie Mellon University Computer Science Technical Report CMU-CS-99-160, Jul. 1999, 222 pages.
Gobioff, Howard, et al., "Smart Cards in Hostile Environments," Proceedings of the Second USENIX Workshop on Electronic Commerce, pp. 23-28 (Nov. 18-21, 1996).
Graham, et al, "Data Protection at the Volume Level," IBM Technical Disclosure Bulletin, pp. 146-148, Oct. 1988.
Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).
Hwang, et al., "An Access Control Scheme Based on Chinese Remainder Theorem and Time Stamp Concept," Computers & Security, vol. 15. No. 1. pp. 73-81,1996.
IBM Crypto Server Management General Information Manual, First Edition (May 2000), 16 pages.
IBM SecureWay Cryptographic Products IBM 4758 PCI Cryptographic Coprocessor Installation Manual, Security Solutions and Technology Department, Second Edition (Mar. 2000), 34 pages.
IBM Integrated Cryptographic Coprocessors for IBM eServer zSeries 900 and for IBM S/390 Servers (Data sheet), 2000, 4 pages.
IBM SecureWay, UltraCypher Cryptographic Engine (Datasheet) (1998), 2 pages.
IBM 4758 PCI Cryptographic Coprocessor Custom Software Installation Manual, Second Edition, Jan. 2001, 30 pages.
Avoid Litigation: Encrypt Your Data, InfoTech Research Group, Sep. 19, 2006, 6 pages.
Johnson et al., "Self-Destructing Diskette," IBM Technical Disclosure Bulletin, vol. 33, No. 1A, pp. 218-219 (Jun. 1990).
Mallett, "Considerations for Applying Disk Encryptors 10 Environments Subject to Hostile Overrun," IEEE, pp. 218-222, 1991.
Mauriello, "TCFS: Transparent Cryptographic File system," LINUX Journal, Aug. 1, 1997, 8 pages
Menezes et al., "Handbook of Applied Cryptography," CRC Press, Section 13.7.1, 4 pages, 1997.
Moore, "Preventing Access to a Personal Computer," IBM Technical Disclosure Bulletin, pp. 98-100, Sep. 1992.
Omniva Policy Systems, www.omniva.com, (Aug. 2004), downloaded from web.archive.org on Aug. 24, 2004, 19 pages.
Provos, Niels, "Encrypting Virtual Memory," CITI Technical Report 00-3, Center for Information Technology Integration, University of Michigan, Apr. 25, 2000, 11 pages.
Scherzer. "Memory Protection in Chip Cards," IBM Technical Disclosure Bulletin, pp. 416-417, Oct. 1989.
Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.
Slusarczuk et al., "Emergency Destruction of Information Storage Media," Institute for Defense Analysis, IDA Report R-321, Dec. 1987, 196 pages.
Smith, "Verifying Type and Configuration of an IBM 4758 Device: A While Paper," IBM T.J. Watson Research Center pp. 1-7 (218/00).
Smith et al., "IBM Research Report: Building a High-Performance, Programmable Secure Coprocessor," IBM Research Division, Computer Science/Mathematics, RC 21102(94393) (Feb. 19, 1998), 61 pages.
Stinson, Douglas R., "Cryptography: Theory and Practice," CRC Press, Mar. 1, 1995, 228 pages.
Vernam, "Cipher Printing Telegraph Systems for Secret Wire and Radio Telegraphic Communications," Journal of the Al EE. pp. 109-115, Feb. 1926.
Weingart, "Physical Security for the uABYSS System," Proceedings 1987 IEEE Symposium on Security and Privacy, pp. 2-58 (Apr. 27-29, 1987), pp. 52-58.
Whitten et al., "Usability of Security: A Case Study," CMU Computer Science Technical Report CMU-CS-98-155. pp. 1-39, Dec. 18, 1998.
Yee et al., "Secure Coprocessors in Electronic Commerce Applications," Proceedings of the First USENIX Workshop of Electronic Commerce, pp. 155-170, Jul. 11-12, 1995.
Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).
Zadok et al., "Cryptfs: A Stackable Vnode Level Encryption File System," Computer Science Department, Columbia University, CUCS-021-98, pp. 1-14, Jun. 1998.

* cited by examiner

HOST BASED REKEYING

FIELD OF THE INVENTION

The present invention relates to secure storage in a storage system, and more specifically, to generation and control of encryption keys used by secure systems, and even more particularly to control of re-keying operations.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

Herein the term "client" and "host" are used interchangeably.

Where the information is organized as files, the client requesting the information, typically maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun (logical unit number).

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

In practical systems encrypted data stored on a disk block (or other cryptainer) is often re-keyed, that is re-encrypted, according to a policy. If for example, the policy may dictate that, if an encryption key is compromised, the data may not be secure and must be re-keyed or re-encrypted. The policy may also dictate that, as a matter of common practice, data might be regularly re-encrypted on a time basis. For example, for critical information the data may be re-encrypted every day or week or month, whereas other data may be re-encrypted over longer time periods, e.g., every year. Herein re-keying involves reading and decrypting ciphertext data with the old key to yield clear data, and then re-encrypting the clear data with a new encryption key and restoring the data to the storage medium.

In some systems the security appliance performs the encryption and decryption, and, in addition, the security appliance may control access to both the storage and the client or authentication, where only "secure known" clients are served. The security appliance is the proxy for both the client and the storage system. That is the security appliance appears as the storage system to the client and appears as the client to the storage system. Additionally, re-keying is also handled by the security appliance, where the security appliance manages the key(s) and the block(s) associated with each key. In known systems each file may be encrypted with a given key and the file and the key are stored and tracked by the security appliance using a file system to manage all the file keys.

The security appliance logs and tracks the activities for a large number of differs ent clients, a large number of different file blocks, a large number of different encryption keys that must be generated and implemented, and a large number of different storage systems. The security appliance store the policy governing such re-keying while tracking a very large number of new keys and corresponding very large number of blocks being re-keyed. The security appliance interacts with the storage system to reserve space and to initiate reads and writes to that space, and it ensures that there is no interference among the clients, files, keys, and storage systems.

The volume of tasks enumerated above may affect system performance. The operations may be slowed and become more inflexible due to the work load. Accordingly, it may be advantageous to offload or shift some of the tasks performed by the security appliance to improve performance.

SUMMARY OF THE INVENTION

The present invention addresses limitations in the known systems by shifting tasks from the security appliance to the clients or hosts. In particular the policy governing compromised keys and initiating re-writing (re-keying) of stored ciphertext may be transferred from the security appliance to the client/host. In such a system, the security appliance still generates encryption keys, performs the encryption and decryption and tracks which block or blocks of a storage system are encrypted with what keys.

System performance may be improved with the security appliance performing fewer tasks, and, with improved performance, the system becomes more flexible to accommodate other possible configurations and arrangements.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention includes a host initiating re-keying of stored ciphertext. The host may directly connect to a security appliance or the storage system having a security module 404 as illustrated in FIGS. 1A and 1B.

Figure 1A:
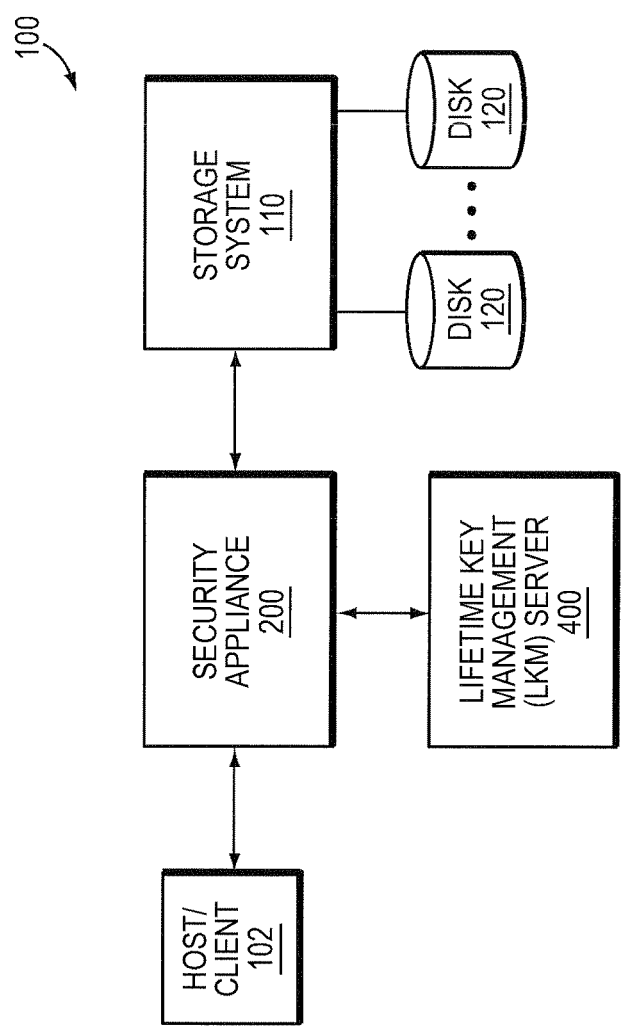
FIGS. 1A and B are schematic block diagrams of an environment including a multi-protocol security appliance that may be advantageously used with the present invention.
Figure 1B:
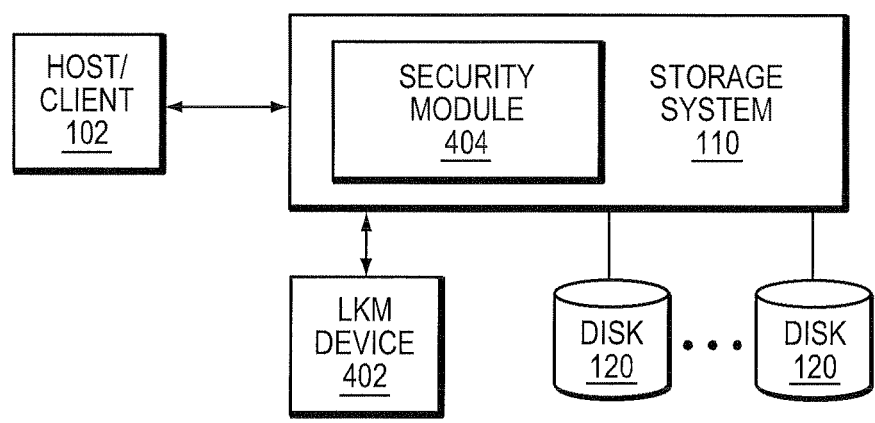

FIG. 1A is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200 intercepts a data access request issued by client 102, destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. The security appliance, in addition to encrypting and decrypting, addresses the storage system 110, provides authentication, secure-logging and "virtualization." Virtualization refers to the security appliance appearing as if it were the storage system to the client, while appearing as if it were the client to the storage system.

A lifetime key management (LKM) server 400 is configured to manage all encryption keys used by the security appliance 200 to encrypt and decrypt data securely stored on the storage system 110, ensuring encryption key availability for the life of the secured data. For example, the LKM server 400 receives encrypted cryptainer keys from the security appliance 200 and sends encrypted cryptainer keys on demand to the appliance. The LKM server is further configured to support a plurality of security appliances 200 such that, when a particular appliance encounters a data access request directed to a cryptainer for which it does not have the appropriate key, that appliance accesses the LKM server 400 to receive the appropriate key.

In FIG. 1B, the security aspects are part of the storage system itself, and the LKM functions are handled by a device 402 connected to the storage system. In some illustrative embodiments, the LKM may be constructed as backup storage for the encryption keys used by the single storage system.

The actual implementations within the systems of FIGS. 1A and 1B may comprise hardware, firmware, software or combinations thereof.

The clients may be running conventional operating system software, for example Windows or Unix, but other operating systems may be used, and, further, the operations may be implemented in hardware or firmware/hardware, etc. The protocol governing the communications between the clients and the security appliance may be XML, but others may be used.

Figure 2:
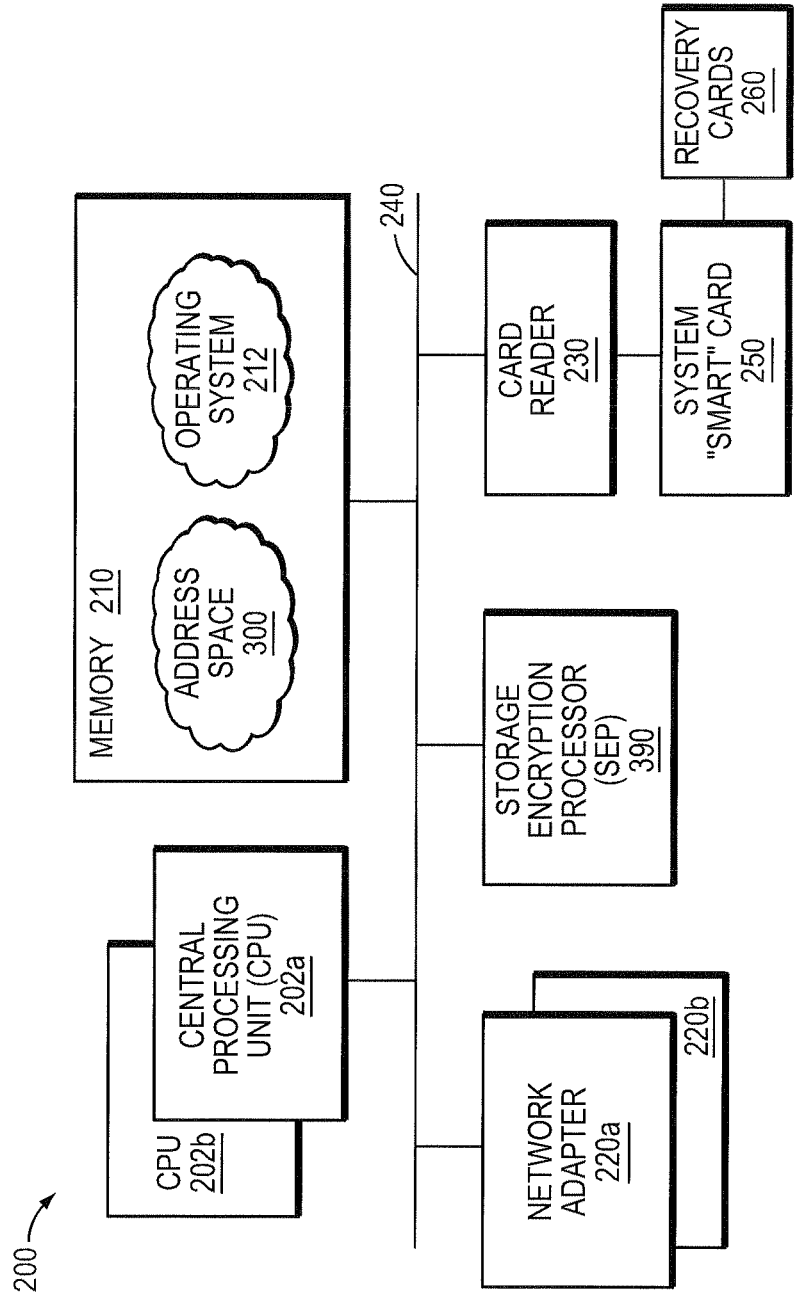
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients/hosts of network attached storage (NAS) and storage area network (SAN) deployments. The security appliance comprises one or more processors, e.g., central processing units (CPU 220a,b), a memory 210, one or more network adapters 220a,b, and a storage encryption processor (SEP 390) interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

The SEP 390 illustratively implements the AES-256 encryption algorithm. However, in alternative embodiments, the SEP 390 may implement additional and/or differing encryption algorithms including, e.g., HMAC-SHA-512, deterministic random number generator (DRNG) using SHA-1, elliptic curve cryptography, etc.

The network adapters 220a,b couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network or a support computer system. In a NAS environment configured to support, e.g., the conventional Common Internet File System (CIFS) and the Network File System (NFS) data access protocols, the network adapters 220*a,b* may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which are typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Since the SEP 390 protects encryption keys from being "touched" (processed) by the system software executing on the CPU 202, a mechanism is needed, at least initially to load keys into and retrieve keys from the SEP. To that end, the card reader 230 provides an interface between a "smart" system card 250 and SEP 390 for purposes of exchanging encryption keys. Illustratively, the system card is a FIPS 140-2 certified card that is configured with a customized software code. As described further below, a portion of the cryptographic information, needed to initialize the security appliance, is stored on the system card 250, thereby preventing the initialization of the appliance 200 without the presence of the card 250. The security appliance (and card reader 230) are further configured to support additional smart cards 260.

Operationally, encryption keys are exchanged between the SEPs 390 and system card 250, where they are "secret shared" (cryptographically assigned) with the recovery cards 260 as recovery keys. These recovery keys can thereafter be applied (via the recovery cards) to the security appliance 200 to enable restoration of other encryption keys (such as cryptainer keys). A quorum setting for the recovery cards 260 may be provided such that the recovery keys stored on the recovery cards are backed up in a threshold scheme whereby, e.g., any 2 of the 5 default cards can recover the keys. The use of these recovery cards may be referred to herein as activities performed by recovery officers, since the recovery cards are controlled by humans.

The operating system 212 illustratively organizes the memory 210 into an address space arrangement available to the software processes and modules executing on the processors.

Figure 3:
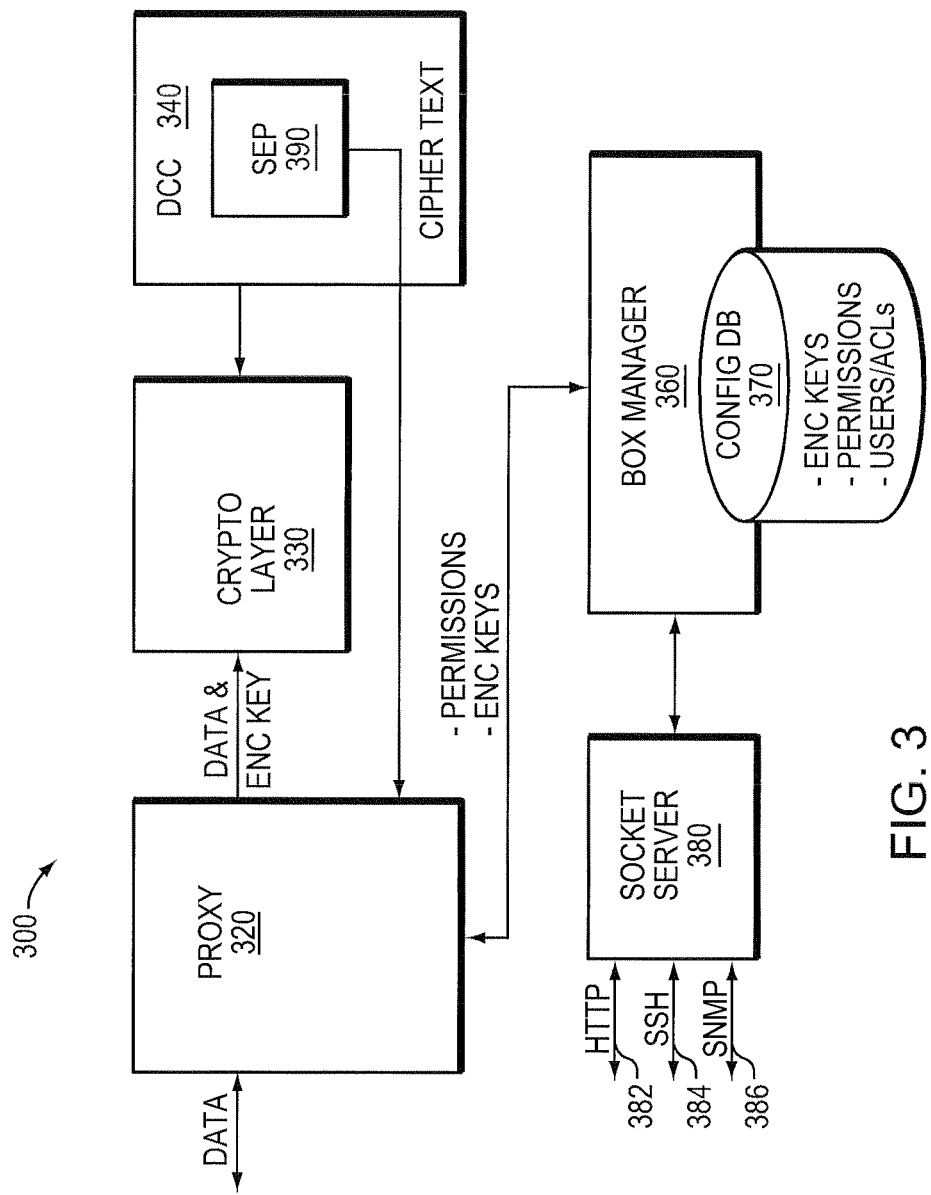
FIG. 3 is a schematic diagram illustrating an arrangement of software processes and modules executing on the security appliance in accordance with the present invention.

FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is a module embodied as, e.g., the network protocol stack configured to interpret the protocol over which data is received and to enforce certain access control rules based on one or more policies. Each policy is served by a box manager 360. The box manager 360 is illustratively embodied as a database application process configured to manage a configuration repository or database (ConfigDB 370) that stores system-wide settings and encryption keys. A socket server 380 provides interfaces to the box manager 360, including (i) an HTTP web interface 382 embodied as, e.g., a graphical user interface (GUI) adapted for web-based administration, (ii) an SSH interface 384 for command line interface (CLI) command administration, and (iii) and a SNMP interface 386 for remote management and monitoring.

Specifically, the box manager 360 supplies permissions and encryption keys to the proxy 320, which intercepts data access requests and identifies the source (clients 102) of the those requests, as well as the types of requests and the storage targets (cryptainer) of those requests. The proxy also queries the box manager for permissions associated with each client/host and, in response, the box manager 360 supplies the appropriate permissions and encryption key (e.g., a cryptainer key). The proxy 320 then bundles the data together with the encryption key and forwards that information to a crypto layer 330.

The crypto layer 330 interacts with the DCC 340 (Data Crypto Card) by accessing (reading and writing) registers on the DCC and, to that end, functions as a system bus interface to present the starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Figure 4:
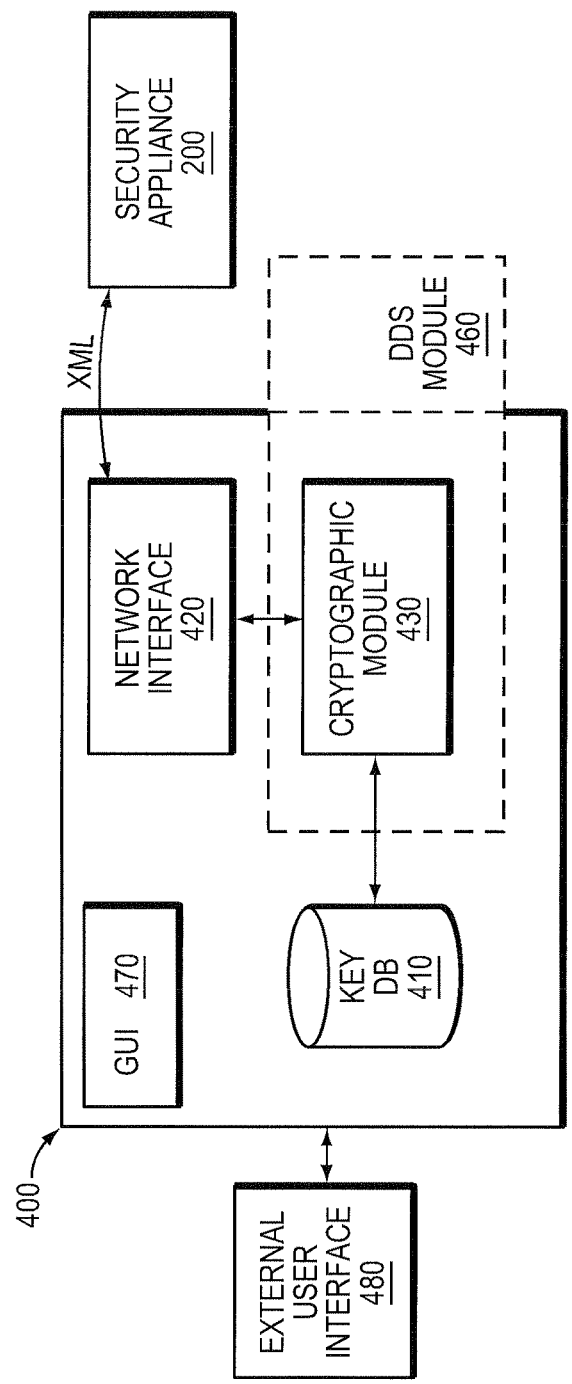
FIG. 4 is a schematic block diagram of a lifetime key management (LKM) server that may be advantageously used with the present invention.

FIG. 4 is a schematic block diagram of the LKM server 400 that may be advantageously used with the present invention. The LKM server may be illustratively embodied as software running on a machine, such as a computer executing, e.g., the conventional Windows operating system. However, it will be understood to those of skill in the art that the LKM server could also be embodied as hardware. The LKM 400 includes a key database 410, which is illustratively a relational database (e.g., a conventional SQL database) or other database configured to store keys. A network interface 420 provides connections to all security appliances 200 that utilize the LKM server. The LKM 400 illustratively communicates with the security appliance 200 via a proprietary protocol, preferably based on XML. A cryptographic module 430 is configured to implement algorithms needed to perform cryptographic operations for the LKM.

An overlapping, data decryption software (DDS) module 460 "shares" the cryptographic module (e.g., its algorithms) on the LKM server. Illustratively, the function of the DDS 460 is to decrypt a piece of storage (e.g., a file) with an appropriate key to thereby enable recovery of the data contained in the file. To that end, the DDS functions as a data recovery software module. The LKM server 400 also includes a GUI 470 that provides a user with an interface to the functionality of the LKM and DDS 460. Alternatively, an external user interface 480 may run on a stand alone machine, such as a Windows management station, to provide GUI functionality for the LKM.

In the illustrative embodiment, the LKM 400 is embodied as an independent server that is coupled to one or more security appliances 200. When initializing a security appliance, a system administrator specifies the LKM 400 with which the appliance is to communicate. In addition, a trust relationship is established between the security appliance and the LKM using, e.g., a shared secret or certificate to establish a secure communication channel. Note that storage of the key on the key database 410 is primarily for redundancy/backup of the key to thereby reduce the chances of data loss for information protected by the key.

In accordance with an aspect of the invention, the client/host may store and enforce one or more policies that may include re-writing ciphertext. When initializing the system of FIG. 1A or 1B, an administrator may communicate with the host via a GUI attached to the host or to the computing functions within the storage system 110. The administrator may enter re-writing policies within the host that are to be exercised by the host. Those policies reduce the chances of others obtaining information protected by a key. Among the more common policies is that if a key has been or thought to have been compromised re-writing may be ordered. Another common policy includes setting an expiration time for the keys, where the host tracks the expiration time with the key. When a key's expiration time is reached, the data encrypted with that key is re-written. In each instance of re-keying the old keys are deleted after their final use. The host may enforce other attributes input by the administrator, one such attribute may restrict the key to only reading and not writing data.

For example, if a key has been compromised, or if a time limit attribute of a key has expired, policy may instruct the client/host to re-write (re-key) group or all the blocks of a storage system. In response, the client host issues a re-write command to the security appliance, which generates new encryption keys. The stored ciphertext in the blocks is read and decrypted using the old keys and then re-encrypted using the new keys and written back into the same storage blocks. Thereafter, the old keys are deleted. The security appliance maintains a table or database that associates encryption keys with storage blocks.

In some systems, not shown, encryption keys are wrapped within another encrypted layer using a second encryption key. Such system may be used advantageously with the present invention. Notably, a file key may be used to encrypt a data file, and an cryptainer key may be used to encrypt part of a metadata portion of the file. That is, each file key is encrypted and signed with the cryptainer key.

Figure 5:
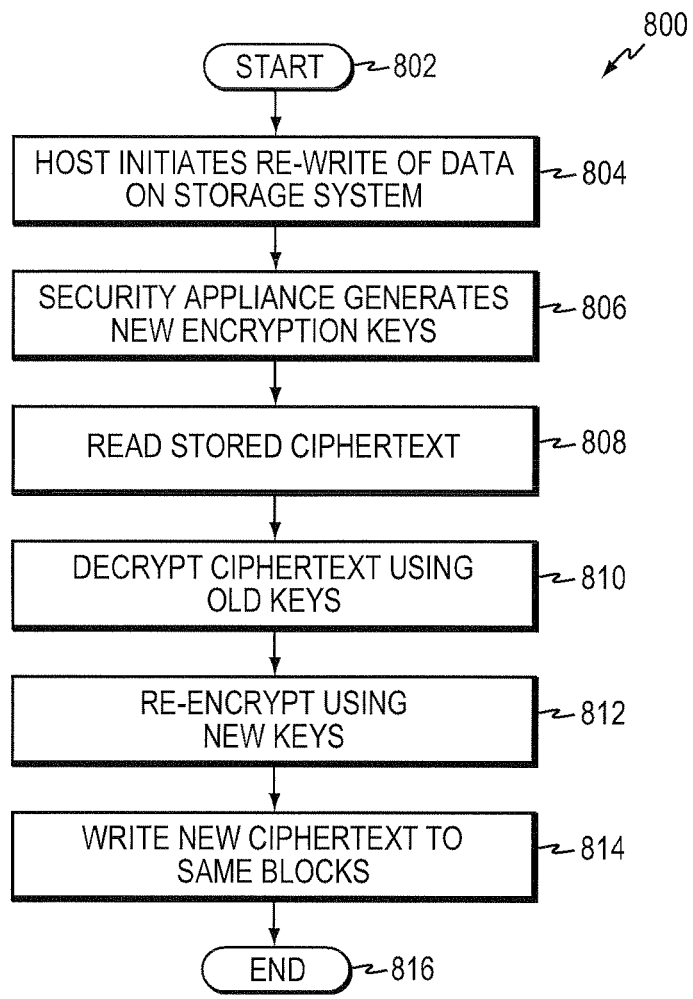
FIG. 5 is a flowchart illustrating a re-keying procedure in accordance with an illustrative embodiment of the present invention.

FIG. 5 is a flowchart illustrating a re-keying procedure 800 in accordance with the present invention. The procedure 800 starts at Step 802 and proceeds to Step 804 where a client/host operating under a given policy initiates a re-writing of a specified group (or all) of the stored blocks of data. The security appliance, in response, initiates re-keying of the ciphertext data on the designated areas (blocks) of the storage system. At step 806 security appliance generates new encryption keys, and in step 808 reads ciphertext from the storage system. The ciphertext is decrypted in step 810 using the old key or keys, and then the data is re-encrypted using the new keys in step 812. In step 814 the security appliance writes the re-encrypted ciphertext into the same blocks in the storage system. The procedure ends in step 816. In other illustrative embodiments, the re-encrypted ciphertext may be written into other blocks within the storage system, as known to those skilled in the art.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   receiving, by a computing device, a re-key command issued by a host computer for one or more stored ciphertexts each associated with one of a plurality of designated data blocks stored on one or more disk storage devices, wherein the issuing of the re-key command is initiated based on one or more re-writing policies that tracks thresholds associated with one or more old encryption key attributes stored on the host computer; and
   generating, by the computing device, a plurality of new encryption keys, upon receipt of the re-key command issued from the host computer, wherein the plurality of new encryption keys are adapted to apply to the one or more stored ciphertexts;
   reading, by the computing device, the one or more stored ciphertexts;
   decrypting, by the computing device, the one or more stored ciphertexts using one or more old encryption keys to produce a decrypted data file comprising content;
   re-encrypting, by the computing device, a portion of the decrypted data file using a first one of new encryption keys and re-encrypting another portion of the data file using a second one of new encryption keys to produce re-encrypted ciphertext; and
   writing, by the computing device, the re-encrypted ciphertext, into the one or more disk storage devices.

2. The method of claim 1 wherein the issuing of the re-key command is initiated based on one or more re-writing policies that tracks temporal thresholds associated with one or more old encryption key attributes stored on the host computer.

3. The method of claim 1 wherein the a portion of the decrypted data file comprises a data portion of the file and the first one of new encryption keys comprises a file key.

4. The method of claim 3 wherein the another portion of the decrypted data file comprises a metadata portion of the file and the second one of new encryption keys comprises a cryptainer key.

5. The method of claim 4 wherein the file key is encrypted and signed with the cryptainer key.

6. The method of claim 1 wherein writing the re-encrypted ciphertext comprises writing into the same one of the plurality of designated data blocks from which the one or more stored ciphertexts were read.

7. The method of claim 1 to providing a logical unit number that contains a location of the one or more stored ciphertexts.

8. A computing device comprising:
   a memory containing a machine readable medium comprising machine executable code having stored thereon instructions for performing a method of providing data sessions with clients that access data containers of a shared storage; and
   a processor coupled to the memory, the processor configured to execute the machine executable code to cause the processor to:
   receive a re-key command issued by a host computer for one or more stored ciphertexts each associated with one of a plurality of designated data blocks stored on one or more disk storage devices, wherein the issuing of the re-key command is initiated based on one or more re-writing policies that tracks thresholds associated with one or more old encryption key attributes stored on the host computer; and generate a plurality of new encryption keys, upon receipt of the re-key command issued from the host computer, wherein the plurality of new encryption keys are adapted to apply to the one or more stored ciphertexts;

read the one or more stored ciphertexts;

decrypt the one or more stored ciphertexts using one or more old encryption keys to produce a decrypted data file comprising content;

re-encrypt a portion of the decrypted data file using a first one of new encryption keys and re-encrypting another portion of the data file using a second one of new encryption keys to produce re-encrypted ciphertext; and write the re-encrypted ciphertext, into the one or more disk storage devices.

9. The device of claim 8 wherein the processor is further configured to execute the machine executable code to cause the processor to write the re-encrypted ciphertext into a same one or more blocks from which the stored ciphertext were read.

10. The device of claim 8 wherein the processor is further configured to execute the machine executable code to cause the processor to provide a logical unit number that contains a location of the ciphertext.

11. The device of claim 8 wherein the issuing of the re-key command is initiated based on one or more re-writing policies that tracks temporal thresholds associated with one or more old encryption key attributes stored on the host computer.

12. The device of claim 8 wherein the a portion of the decrypted data file comprises a data portion of the file and the first one of new encryption keys comprises a file key.

13. The device of claim 12 wherein the another portion of the decrypted data file comprises a metadata portion of the file and the second one of new encryption keys comprises a cryptainer key.

14. The device of claim 13 wherein the file key is encrypted and signed with the cryptainer key.

15. A non-transitory machine readable medium having stored thereon instructions for performing a method comprising executable code that, when executed by at least one machine, causes the machine to:

receive a re-key command issued by a host computer for one or more stored ciphertexts each associated with one of a plurality of designated data blocks stored on one or more disk storage devices, wherein the issuing of the re-key command is initiated based on one or more re-writing policies that tracks thresholds associated with one or more old encryption key attributes stored on the host computer; and generate a plurality of new encryption keys, upon receipt of the re-key command issued from the host computer, wherein the plurality of new encryption keys are adapted to apply to the one or more stored ciphertexts;

read the one or more stored ciphertexts;

decrypt the one or more stored ciphertexts using one or more old encryption keys to produce a decrypted data file comprising content;

re-encrypt a portion of the decrypted data file using a first one of new encryption keys and re-encrypting another portion of the data file using a second one of new encryption keys to produce re-encrypted ciphertext; and write the re-encrypted ciphertext, into the one or more disk storage devices.

16. The medium of claim 15 wherein the issuing of the re-key command is initiated based on one or more re-writing policies that tracks temporal thresholds associated with one or more old encryption key attributes stored on the host computer.

17. The medium of claim 15 wherein the a portion of the decrypted data file comprises a data portion of the file and the first one of new encryption keys comprises a file key;

wherein the another portion of the decrypted data file comprises a metadata portion of the file and the second one of new encryption keys comprises a cryptainer key.

18. The medium of claim 17 wherein the file key is encrypted and signed with the cryptainer key.

19. The medium of claim 15 wherein to write the re-encrypted ciphertext comprises writing into the same one of the plurality of designated data blocks from which the one or more stored ciphertexts were read.

20. The medium of claim 15 to provide a logical unit number that contains a location of the ciphertext.

* * * * *